United States Patent [19]

Wolf

[11] Patent Number: 5,247,785
[45] Date of Patent: Sep. 28, 1993

[54] LOADING DEVICE

[75] Inventor: Johann Wolf, Scharnstein, Austria

[73] Assignee: Wolf Systembau Gesellschaft m.b.H., Scharnstein, Austria

[21] Appl. No.: 852,641

[22] Filed: Mar. 17, 1992

[30] Foreign Application Priority Data

Mar. 20, 1991 [AT] Austria .................................. 625/91

[51] Int. Cl.⁵ .......................................... A01D 87/00
[52] U.S. Cl. ..................................... 56/16.6; 56/350; 414/502
[58] Field of Search ................. 56/350, 364, 351, 16.6, 56/473.5, DIG. 9, DIG. 14; 414/502

[56] References Cited

U.S. PATENT DOCUMENTS 3,389,821  6/1968  Weichel ........................... 414/502 X
4,986,063  1/1991  Eggenmuller ....................... 56/16.6

FOREIGN PATENT DOCUMENTS 212068   11/1960  Austria .
243177   10/1965  Austria .
248328    7/1966  Austria ............................. 414/502
689514    6/1964  Canada ............................. 414/502
1133592   1/1963  Fed. Rep. of Germany .
389975    7/1965  Switzerland .
1458786  12/1976  United Kingdom .

Primary Examiner—Terry Lee Melius
Attorney, Agent, or Firm—Young & Thompson

[57] ABSTRACT

A loading device (1) for feeding cereal crop material, picked up from the ground by a gathering drum (8), into a loading vehicle (2) comprises a conveying drum (12) in a conveying channel (10) which latter is substantially perpendicular and terminates approximately at the level of a loading surface (7) of the loading vehicle (2), and thereafter comprises a horizontal or slightly inclined conveying channel (13) extending into the loading vehicle (2), conveying elements (14) driven in revolving fashion being arranged in this conveying channel (13).

9 Claims, 2 Drawing Sheets

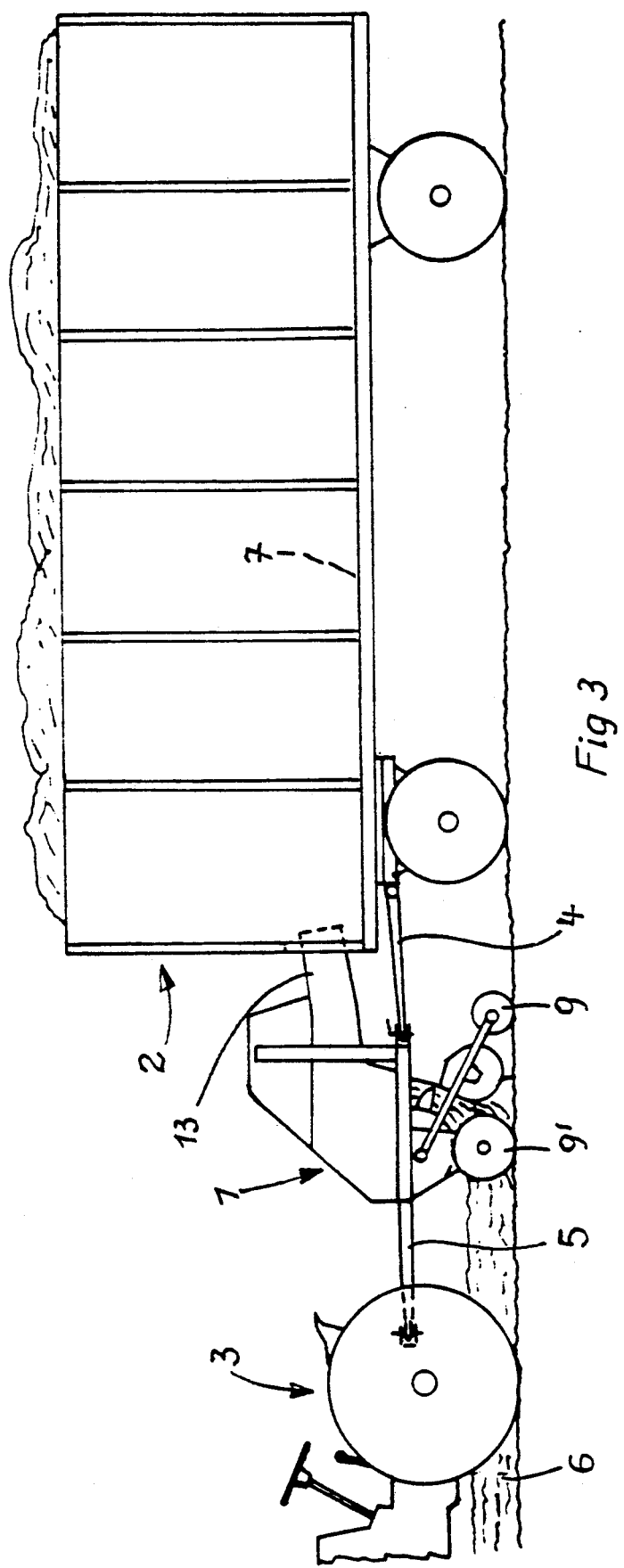

LOADING DEVICE

FIELD OF THE INVENTION

The invention relates to a pulled loading device for loading preferably two-axle or multiple-axle trailer vehicles with superstructures extending all around and surrounding a large-capacity space.

BACKGROUND OF THE INVENTION

The conventional loading vehicles wherein the loading device and the transport vehicle are combined into one unit provide a poor degree of efficiency for the loading device in case of large field-farm distances. This loading device is in operation in the field for only a brief period of time and for the longest time is linked to being transported. The limited loading capacity of the loading vehicles additionally diminishes the operating power when harvesting cereal crops over a large area.

SUMMARY OF THE INVENTION

It is an object of the invention to provide a pulled loading unit which picks up the cereal crop material lying on the ground, conveys same to the level of customary loading platforms, and presses the material into the loading space of a preferably multiple-axle conveyor vehicle that can be linked to the loading device. Suitable for this purpose are trailers having appropriate superstructures as customary in agriculture. In order to permit insertion of the harvested material into the loading space, the sideboard at the end wall is removed, the lateral bordering walls being held together by the structure at the end side or, alternatively, care must be taken that a removable or tiltable part is arranged in the end wall vacating a wide slot for the loading process; the trailers can be designed with a closed, solid bottom, with a drag bottom, or in the manner of tippers.

A loading device is suggested for attaining the above-posed object which can be attached to a pulling machine (tractor), is supported on the ground by means of two running wheels, and which picks up the cereal crop material from the ground by means of a gathering drum and conducts the material into the loading space in a conveying channel extending approximately vertically or obliquely and thereafter approximately horizontally, conveying elements being effective in this channel.

BRIEF DESCRIPTION OF THE DRAWINGS

Two embodiments are illustrated in FIGS. 1 and 2, showing the loading device in a sectional view.

In FIG. 3, showing the loading device with the loading vehicle attached thereto.

DETAILED DESCRIPTION OF THE INVENTION

Figure 1:
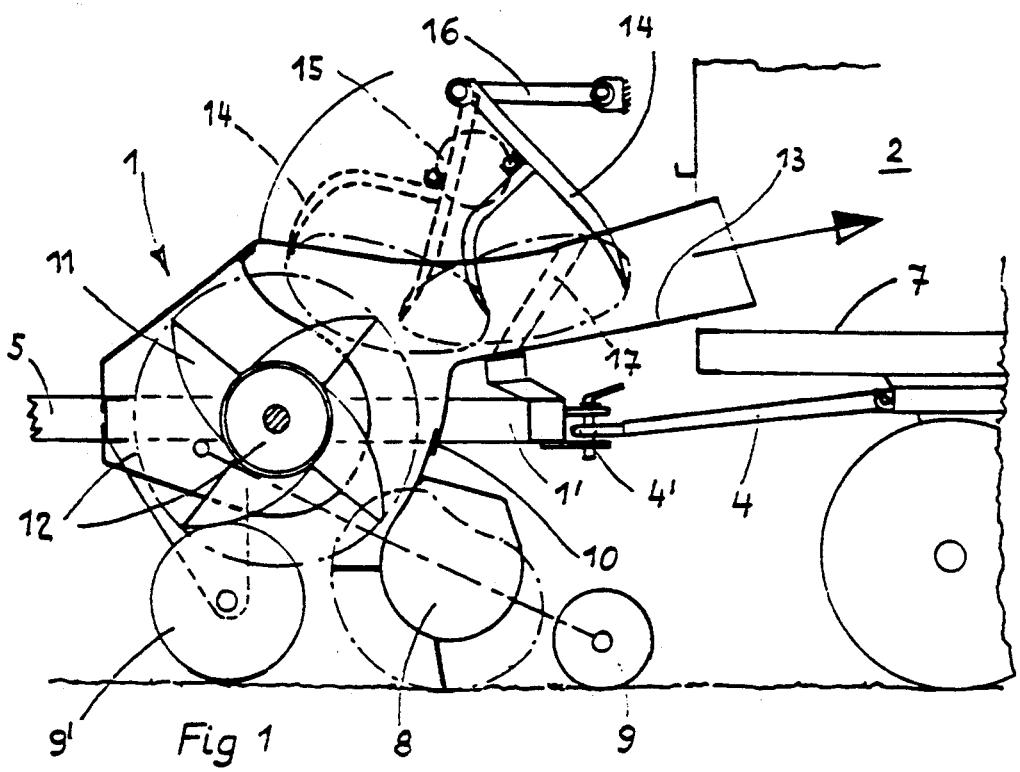

FIG. 1 shows a loading device 1 with a follow-up gathering drum 8 scanning the ground by means of supporting rollers 9 or wheels 9' and picking up the cereal crop 6 from the ground. Curved pickup members 11 of a large-dimensioned conveying drum 12 extend into an approximately perpendicularly oriented conveying channel 10 and push the cereal crop approximately to the level of the loading surface 7. A subsequent, approximately horizontally oriented conveying channel 13 terminates in the loading space of the loading vehicle 2 in the zone of the removed sideboard. This horizontal conveying duct can be inclined with respect to the horizontal to an extent of up to about 30°. Twin spikes 14 engaging into the conveying channel are driven by a bipartite or multipartite crankshaft 15 and describe a long conveying stroke in the conveying channel 13, controlled by guide arms 16, so that a powerful insertion into the loading space is ensured.

In place of the illustrated conveying device, it is also possible to provide two spaced-apart crankshafts on which spike-studded rods are supported. By means of a chain drive connecting the crankshafts, the rods revolve in synchronism, and the spikes enter, in a pushing movement, alternatingly into the horizontal conveying channel. It is likewise possible to utilize, in the perpendicular conveying channel, also a drum-type conveyor with controlled spikes. If needed, a cutting device 17 can be used in the horizontal conveying channel (indicated in dashed lines in FIG. 1).

Figure 2:
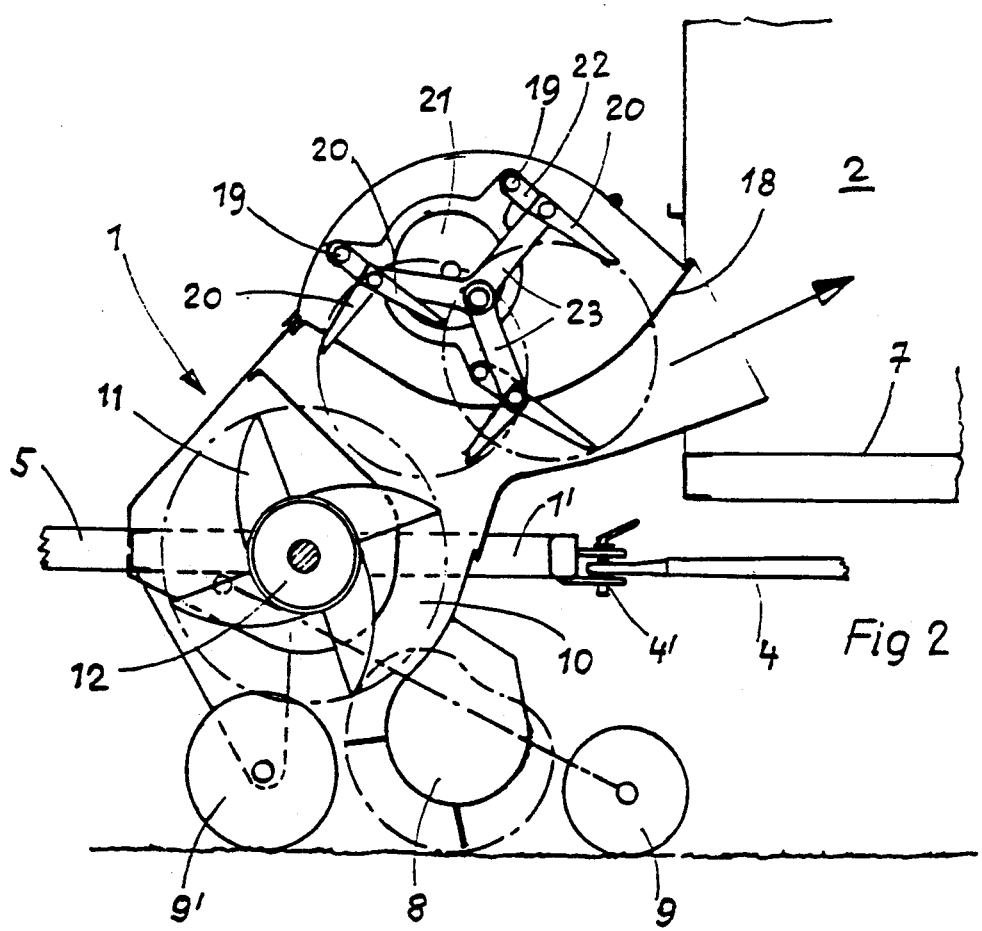

FIG. 2 shows an analogous arrangement with a conveying channel 18 terminating in a steeper fashion. The conveying device consists of a three-part conveying drum with spread-apart spikes 20 articulated by way of joints 19 to an eccentric 21 and being controlled by means of guide levers 22 and a spider 23, whereby likewise a long stroke becomes effective in the conveying channel.

The loading space is stuffed to capacity, independently of a drag bottom, by the vigorous, long-stroke conveying thrusts in the conveying channel 13 or 18. A simple exchange of the loaded trailers is possible by releasing a tie rod 4 connecting the loading vehicle 2 with the loading device 1 via a pulling jaw 4'; in this arrangement, the frame 1' of the loading device 1, is connected via a tie rod 5 to a pulling machine to 3. The loaded loading vehicles 2 are transported away by other pulling machines (see FIG. 3). Thereby, the harvesting efficiency is quite considerably enhanced, and days when the water is good can be better exploited. Emptying of the vehicles at the farm takes place by removing the load by pushing or tipping; alternatively, the vehicles can also be emptied by means of pitchforks.

What is claimed is:

1. In a loading device attachable to a tractor for conveying cereal crop material picked up from the ground by gathering drum into a loading vehicle that can be coupled to a loading device, wherein a conveying drum is arranged in a conveying channel downstream of the gathering drum; the improvement wherein the loading device further includes a horizontal or slightly inclined conveying channel extending in the longitudinal direction into the loading vehicle following a substantially vertical conveying channel terminating approximately at the level of a loading surface of the loading vehicle, and conveying elements driven in revolving fashion being arranged in said horizontal or slightly inclined channel.

2. Loading device according to claim 1, wherein the conveying channel is horizontal, and the conveying elements arranged in the horizontal conveying channel consist of twin spikes driven by a bipartite or multipartite crankshaft, and guide means operatively associated with said conveying elements for controlling said conveying elements.

3. Loading device according to claim 1, wherein the conveying channel is slightly inclined with respect to the horizontal, and the conveying elements arranged in said slightly inclined channel consist of a multipartite conveying drum with spikes articulated to said conveying drum by means of guide levers, said conveying drum being driven by eccentrics.

4. Loading device according to claim 3, wherein the guide levers are articulated to the conveying drum, said spikes being spread apart, and being articulated to spiders which are eccentrically supported on the conveying drum.

5. Loading device according to claim 1, wherein the conveying elements consist of rods studded with spikes, supported on crankshafts which are arranged at lateral spacings from one another.

6. Loading device according to claim 1, further comprising a cutting device arranged in the horizontal or slightly inclined conveying channel.

7. Loading device according to claim 1, further comprising a conveying drum studded with curved dogs arranged in the vertical conveying channel.

8. Loading device according to claim 1, further comprising rollers and/or wheels for supporting said loading device on the ground.

9. Loading device according to claim 1, further comprising a frame, said frame being equipped in a driving direction, with a tie rod for connection to a tractor and, in a direction opposite to the driving direction, with a pulling jaw for detachable articulation of a tie rod of a loading vehicle.

* * * * *